US012600240B2

(12) United States Patent
Verstov et al.

(10) Patent No.: US 12,600,240 B2
(45) Date of Patent: Apr. 14, 2026

(54) METHOD FOR OPERATING A BRAKE CONTROL SYSTEM, BRAKE CONTROL SYSTEM, COMPUTER PROGRAM, AND COMPUTER-READABLE STORAGE MEDIUM

(71) Applicants: Bayerische Motoren Werke Aktiengesellschaft, Munich (DE); Continental Engineering Services GmbH, Frankfurt (DE)

(72) Inventors: Vladimir Verstov, Munich (DE); Jürgen Rahn, Frankfurt Am Main (DE)

(73) Assignees: Bayerische Motoren Werke Aktiengesellschaft, Munich (DE); Continental Engineering Services GmbH, Frankfurt (DE)

( * ) Notice: Subject to any disclaimer, the term of this patent is extended or adjusted under 35 U.S.C. 154(b) by 91 days.

(21) Appl. No.: 18/698,769

(22) PCT Filed: Oct. 10, 2022

(86) PCT No.: PCT/EP2022/078121
§ 371 (c)(1),
(2) Date: Apr. 4, 2024

(87) PCT Pub. No.: WO2023/061948
PCT Pub. Date: Apr. 20, 2023

(65) Prior Publication Data
US 2025/0236179 A1 Jul. 24, 2025

(30) Foreign Application Priority Data
Oct. 15, 2021 (DE) .......................... 102021126804.4

(51) Int. Cl.
*B60L 3/10* (2006.01)
*B60L 7/26* (2006.01)

(52) U.S. Cl.
CPC ................. *B60L 3/108* (2013.01); *B60L 7/26* (2013.01); *B60L 2240/465* (2013.01); *B60L 2260/24* (2013.01)

(58) Field of Classification Search
CPC ...... B60L 3/108; B60L 7/26; B60L 2240/465; B60L 2260/24; B60T 8/17616;
(Continued)

(56) References Cited

U.S. PATENT DOCUMENTS

2015/0274018 A1* 10/2015 Crombez .................. B60L 7/18
701/22
2018/0093571 A1 4/2018 Hall et al.
(Continued)

FOREIGN PATENT DOCUMENTS

DE 19607823 C1 8/1997
DE 102013221979 A1 4/2015
(Continued)

OTHER PUBLICATIONS

English translation of Doi et al. (WO 201506880) (Year: 2015).*
International Search Report of Application No. PCT/EP2022/078121 dated Feb. 3, 2023, 6 pages including translation.

*Primary Examiner* — Kyle J Kingsland
(74) *Attorney, Agent, or Firm* — Morgan, Lewis & Bockius LLP

(57) ABSTRACT

In an example method for operating a brake control system for a vehicle having a first axle and a second axle that follows the first axle in the direction of travel of the vehicle, the brake control system is provided with a thrust signal representative of a coasting mode; depending on the thrust signal, the recuperation brakes are activated; the brake control system is provided with a brake signal representative of a vehicle brake actuation; depending on the brake signal, the brake is triggered; the brake control system is provided with a lock signal representative of an active anti-lock
(Continued)

braking control of the brake; and depending on the lock signal, while maintaining the activation of the recuperation brake associated with the second axle, the recuperation brake associated with the first axle is deactivated. Further provided are a corresponding brake control system, computer program and computer-readable storage medium.

6 Claims, 3 Drawing Sheets

(58) Field of Classification Search
CPC ......... B60T 2270/602; B60T 2270/604; B60T 2270/611; B60T 1/10; B60W 2540/10; B60W 2540/12; B60W 30/18072; B60W 30/18127
See application file for complete search history.

(56) References Cited

U.S. PATENT DOCUMENTS

| | | | |
|---|---|---|---|
| 2019/0193568 A1 | 6/2019 | Cho et al. | |
| 2020/0361318 A1* | 11/2020 | Lee | B60T 1/10 |
| 2021/0229646 A1 | 7/2021 | Kim | |

FOREIGN PATENT DOCUMENTS

| | | | |
|---|---|---|---|
| EP | 3135551 A1 | 3/2017 | |
| JP | 2017-017930 A | 1/2017 | |
| WO | WO-2015068800 A1 * | 5/2015 | B60T 8/267 |

* cited by examiner

METHOD FOR OPERATING A BRAKE CONTROL SYSTEM, BRAKE CONTROL SYSTEM, COMPUTER PROGRAM, AND COMPUTER-READABLE STORAGE MEDIUM

TECHNICAL FIELD

The invention relates to a method for operating a brake control system for a vehicle, a corresponding brake control system, a computer program and a computer-readable storage medium.

DESCRIPTION

In motor vehicles with an electric machine that can be used for recuperation, in particular in vehicles with an electric drive, kinetic energy of the vehicle can be converted into electrical energy during regenerative operation of an electric machine and fed into an electrical energy storage (typically a battery or a capacitor). This conversion of the vehicle's kinetic energy into electrical energy is also known as (electrical) recuperation.

For recuperation, a recuperation torque is typically set on the electric machine, which counteracts the movement of the vehicle and decelerates it.

Recuperation by means of the electric drive can be used, for example, to decelerate the vehicle when the brake pedal is pressed. In so-called brake recuperation, a recuperation torque or a recuperation power is set when the vehicle brakes are actuated, for example when a brake pedal is actuated, depending on the brake pedal travel with which the brake pedal of the vehicle is depressed by a driver.

Furthermore, recuperation can also be used in coasting mode to decelerate the vehicle. In this case, at the end of a vehicle drive actuation, for example at the end of the actuation of the accelerator pedal, or even before this, a thrust recuperation torque (also known as drag recuperation torque) of the vehicle is set whereby the motor vehicle is decelerated.

It may be provided that a thrust recuperation torque is set not only when the vehicle drive actuation is completely terminated, but already when the vehicle drive actuation is cancelled, for example when the accelerator pedal is still slightly depressed; the amount of the thrust recuperation torque generally increases as the vehicle drive actuation decreases and reaches its maximum value when the vehicle drive actuation is terminated. The vehicle can be decelerated in a controlled manner by cancelling the vehicle drive actuation. Recuperation in coasting mode is also referred to as thrust thrust recuperation. In recuperation, a predetermined recuperation torque or a predetermined recuperation power is set, for example, when the driver no longer actuates the accelerator pedal of the vehicle (or only slightly).

Alternatively or additionally, it may be provided that the braking effect when the vehicle brakes are actuated is partially (with simultaneous recuperation) or completely (without recuperation; so-called "partial braking") generated by a mechanical or hydraulic braking system (e.g. a hydraulic disc brake system), in which the kinetic energy of the vehicle is converted into thermal energy (for example in the brake discs). Nowadays, such brake systems usually have an anti-lock braking control (ABS), which is associated with one or more wheels of the vehicle individually or, for example, jointly on each axle. If the corresponding wheel or wheels are recognised as being locked, the braking force generated by the corresponding brake system is reduced, for example by reducing the brake pressure. Recuperation is usually stopped completely when the anti-lock braking control is activated in favour of controllability. Active or activated anti-lock braking control is understood here and in the following to mean active control, not to be confused with the mere activation of monitoring whether locking occurs.

The foregoing description may include information that describes one or more aspects of the subject technology, and the description in this section does not limit the invention.

SUMMARY

The task underlying the invention is to provide a method for operating a brake control system for a vehicle as well as a corresponding brake control system, computer programme and computer-readable storage medium.

The problem is solved by the subject matter of the independent patent claims. Advantageous embodiments are characterised in the dependent claims.

According to a first aspect, the invention relates to a method for operating a brake control system for a vehicle.

The vehicle comprises a first axle and a second axle that follows the first axle in the direction of travel of the vehicle. The first and second axles can also be referred to as front and rear axles or vice versa. At least one wheel of the vehicle is associated with each axle. For example, each axle of the vehicle can be associated with exactly one wheel, exactly two wheels or even more than two wheels.

The first axle is associated with a recuperation brake for decelerating the vehicle while feeding energy back into an energy storage of the vehicle. The second axle is also associated with a recuperation brake for decelerating the vehicle while feeding energy back into an energy storage of the vehicle. A recuperation brake is in particular an electric machine, for example a drive of the vehicle. In particular, the vehicle is a passenger car, lorry, motorbike or scooter designed as an electric or hybrid vehicle. A recuperation brake can be provided for each wheel or axle of the vehicle, for example. It is also conceivable that the vehicle has precisely one electric drive machine that can be controllably coupled to the first and second axles in such a way that a recuperation brake can be assigned to each of the first and second axles to decelerate the vehicle.

In addition, a brake with anti-lock braking control is associated with the first axle. In particular, the brake is a mechanical or hydraulic brake. In particular, one brake is provided for each wheel of the vehicle.

In step a) of the method, the brake control system is provided with a thrust signal that is representative of a coasting mode of the vehicle.

As explained at the beginning, for example, a reduction or an (imminent) termination of a vehicle drive actuation can be determined for this purpose, such as a reduction or an (imminent) termination of the actuation of the accelerator pedal or a correspondingly performed or automatic setting of a cruise control system of the vehicle, which is representative of a recuperation torque to be set by the (corresponding) recuperation brake.

In step b), the recuperation brakes associated with the first and second axles are activated depending on the thrust signal. In other words, the first and second axles are braked while energy is fed back into an energy storage of the vehicle.

In step c), the brake control system is provided with a brake signal that is representative of a vehicle brake actuation.

As explained at the beginning, for example, an actuation of the brake pedal or a brake pedal travel or a corresponding or automatic setting of a cruise control system of the vehicle can be detected for this purpose, which is representative of a braking force or braking pressure to be generated by the (corresponding) brake.

In step d), the brake associated with the first axle is triggered depending on the brake signal. In other words, the first axle is braked, in particular significantly by converting kinetic energy of the vehicle into thermal energy.

In step e), the brake control system is provided with a lock signal that is representative of an active anti-lock braking control of the brake associated with the first axle. For example, the anti-lock braking control detects a locking of one (or more) wheels and autonomously controls the braking force or pressure of the corresponding brake independently of the brake control system. In this context, the brake control system is, for example, merely provided with an indicator which shows whether the anti-lock braking control is active or not.

In a step f), the recuperation brake associated with the first axle is deactivated depending on the lock signal and while maintaining the activation of the recuperation brake associated with the second axle. In other words, when the anti-lock braking control of the brake associated with the first axle is active, the second axle continues to be braked while energy is fed back into an energy storage of the vehicle.

In an advantageous way, this enables increased deceleration of the vehicle, particularly with a low coefficient of friction to the ground (so-called "low μ", e.g. with values μ<0.5), while maintaining the controllability of the anti-lock braking control.

In an advantageous embodiment according to the first aspect, the recuperation brakes associated with the first and second axles are each set to a thrust recuperation state in step b).

A recuperation torque set for recuperation on the (corresponding) recuperation brake in the thrust recuperation state counteracts the movement of the vehicle and decelerates it.

In a further advantageous embodiment according to the first aspect, the recuperation brakes associated with the first and second axles are each set to a brake recuperation state in step d).

A recuperation torque set for recuperation on the (corresponding) recuperation brake in the brake recuperation state counteracts the movement of the vehicle and decelerates it.

The recuperation torque of a recuperation brake in the brake recuperation state is preferably higher, in particular several times higher, than the recuperation torque of the corresponding recuperation brake in the thrust recuperation state.

In a further advantageous embodiment according to the first aspect, the second axle is associated with a further brake with anti-lock braking control. In step d), depending on the brake signal, the further brake associated with the second axle is triggered.

In a further advantageous embodiment according to the first aspect, in step g), the brake control system is provided with a further lock signal that is representative of an active anti-lock braking control of the brake associated with the second axle.

In step h), depending on the further lock signal, the recuperation brake associated with the second axle is deactivated. In other words, only when the anti-lock braking control of the brakes associated with the first and second axles is active is braking of the vehicle with energy being fed back into an energy storage of the vehicle dispensed with and the vehicle is decelerated only by converting kinetic energy of the vehicle into thermal energy.

In an advantageous manner, the full potential of the existing coefficient of friction, in particular with regard to the second axle, can thus be utilised, which contributes both to increased deceleration of the vehicle and to increased energy recovery compared to deactivation of all recuperation brakes when one (or more) wheels associated only with the first axle are locked.

According to a second aspect, the invention relates to a brake control system for a vehicle.

The vehicle comprises a first axle and a second axle that follows the first axle in the direction of travel of the vehicle.

The first axle is associated with a recuperation brake for decelerating the vehicle while feeding energy back into an energy storage of the vehicle The second axle is also associated with a recuperation brake for decelerating the vehicle while feeding energy back into an energy storage of the vehicle.

Furthermore, the first axle is associated with a brake with anti-lock braking control.

The brake control system is configured to perform the method according to the first aspect.

According to a third aspect, the invention relates to a computer program for operating a brake control system.

The computer program comprises instructions, which, when executed on a computer, cause it to perform the method according to the first aspect.

According to a fourth aspect, the invention relates to a computer-readable storage medium.

The computer-readable storage medium stores the computer program according to the third aspect.

BRIEF DESCRIPTION OF THE DRAWINGS

Example embodiments of the invention are detailed along the schematic drawings in that.

DETAILED DESCRIPTION

Elements of the same design or function are labelled with the same reference symbols across all figures.

At low friction, a motor vehicle decelerates worse in the partially braked range, i.e. in the event that the braking effect is generated exclusively by the mechanical or hydraulic brake system, with active anti-lock braking control of the brake system of one axle (two wheels) than with recuperation on all four wheels. In the following, an improvement in the overall deceleration of electrified vehicles in the partially braked range and only one axle (preferably the front axle) in ABS control is proposed through simultaneous recuperation on the non-ABS braked (rear) axle, and thus an increase in the overall vehicle deceleration to the identical level as during recuperation on all four wheels.

If the front axle, especially at a low coefficient of friction, is in ABS control and the rear axle is not, braking may be interrupted because the rear axle does not utilise its full braking potential (see M* in FIG. 3 and RHA* and V* in FIG. 6 right)—the ABS attempts to enable maximum deceleration at the given coefficient of friction.

Figures 1, 2, 3, 4, 5:
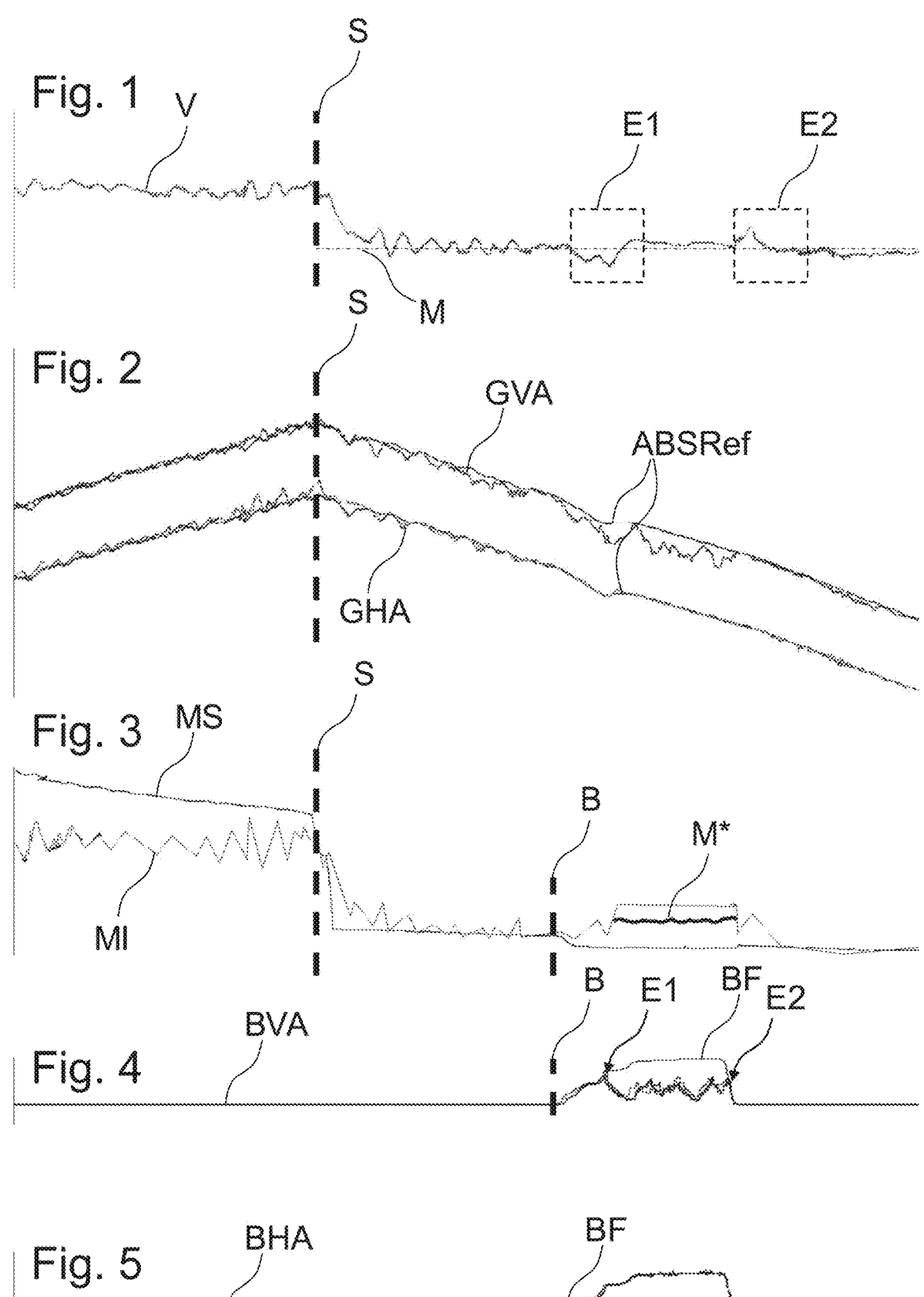
FIGS. 1 to 5 illustrate example measured parameters when operating a vehicle.

The wheels of the underbraked axle then run at the ABS reference speed ABSRef (see GHA in FIG. 2 below), while a slip pattern (usual for an ABS control system) can be recognised on the front axle (see GVA in FIG. 2 above).

The pressure BHA applied to the rear axle corresponds to the driver's brake pressure BF (see FIG. 5). If ABS braking is detected, regardless of the wheel, the recuperation can be cancelled/deactivated and the ABS takes over the task of decelerating the vehicle. If, as described, only one axle is in ABS control, then the full potential of the available coefficient of friction cannot be utilised (see M* in FIG. 3 and RHA* and V* in FIG. 6 right).

In the brake control system and method of operation proposed here, recuperation is maintained on the non-ABS braked until it is also in ABS control. This can help to avoid dips in the deceleration (see E1 in FIG. 1) and thus barely resolve the transition from recuperation to ABS. In an advantageous way, maximum deceleration without deceleration fluctuations is achieved or contributed to.

During the transition from recuperation braking, i.e. the vehicle decelerates purely via recuperation to partially braked driver braking, it can happen that the front axle runs into ABS control at low u, i.e. low friction, but the rear axle, e.g. due to the higher axle load at the rear, which is common in electric or hybrid vehicles ("battery electric vehicle", BEV or "plug-in hybrid electric vehicle", PHEV), and the fact that the driver's pre-pressure BF on the brake is still too low, the rear axle may not enter ABS control (see FIG. 5), as the necessary thresholds are not met. This leads to a noticeable reduction in vehicle deceleration (see E1 in FIG. 1), as recuperation is reduced when ABS braking is recognised. To prevent this, a recuperation function ("actuator-related wheel slip limitation") on the non-ABS braked axle would have to maintain recuperation until the axle is also brought into ABS control. The transition from recuperation and driver braking to ABS is preferably applicable in a ramped manner in order to make deceleration changes as comfortable as possible. By way of example, the situation without using the brake control system according to the invention or the method for operating it is described using a measurement (see FIGS. 1 to 5).

FIG. 1 shows a measured curve of the (total) deceleration V of the vehicle. The vertical dashed line indicates the starting point S of the recuperation, after which the deceleration V is largely reduced to an average value M (horizontal dash-dot line, while recuperation here is approx. −0.2 g). The dashed outline shows an area E1, E2 where the ABS control starts and the deceleration drops accordingly (left, E1) as well as where the ABS control stops and the deceleration increases accordingly (right, E2).

FIG. 2 shows a measured curve of the vehicle's wheel speeds. The speed GVA of the left and right front wheels and an ABS reference speed ABSRef are shown at the top, while the speed GHA of the left and right rear wheels and an ABS reference speed ABSRef are shown at the bottom. During recuperation (to the right of the starting point S of recuperation), the curve of the speed GVA, GHA shows a slip on both the front and rear axles; after entering ABS control (see E1 in FIG. 1 and FIG. 4), only the front axle continues to slip, while the progression of the speed GHA of the rear axle runs at the ABS reference speed ABSRef.

FIG. 3 shows a measured curve of the actual braking torque MI of the electric machine and a target braking torque MS. The second vertical dashed line indicates a starting point B for driver braking. After entering the ABS control (see E1 in FIG. 1 and FIG. 4), a clear deviation between the target and actual braking torque MS, MI can be recognised. Also shown in bold is a possible improvement potential M* compared to the measured actual braking torque MI as a result of recuperation in accordance with the proposed brake control system or method of operating it.

FIGS. 4 and 5 show a measured curve of the brake pressure. FIG. 4 shows the brake pressure BVA of the left and right front wheels as well as a driver's pre-pressure BF, while FIG. 5 shows the brake pressure BHA of the left and right rear wheels as well as the driver's pre-pressure BF.

In deviation from the proposed brake control system or method of operating it, recuperation is completely cancelled at the front axle when entering E1 ABS control.

There is no ABS control on the rear axle; as can be seen in FIG. 5, the brake pressure BHA on the wheel corresponds to the driver's brake pressure BF.

Figures 6, 7:
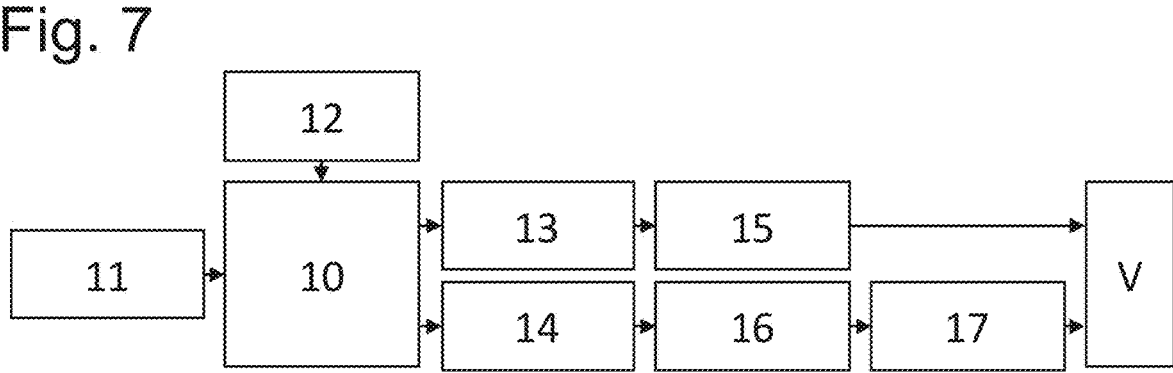
FIG. 6 illustrates an example comparison of state sequences when operating a vehicle.
FIG. 7 illustrates example input and output parameters of a brake control system for a vehicle.

FIG. 6 shows an exemplary comparison of state sequences during operation of a vehicle over time t, whereby situation 1 with the above measurements is shown on the left and situation 2 according to the method proposed here is shown on the right. The values 0 and 1 assigned to the state sequences are merely exemplary and can indicate activation or deactivation or normalisation.

Initially in situations 1 (t1) and 2, the recuperation RVA on the front axle and the recuperation RHA on the rear axle are both active, while the ABS control ABSVA on the front axle and the ABS control ABSHA on the rear axle are inactive, so that a normalised deceleration V=1 is achieved.

Then (t2), the ABS control ABSVA on the front axle is activated and the recuperation RVA on the front axle is deactivated accordingly, while the ABS control ABSHA on the rear axle remains inactive. In situation 1, the recuperation RHA on the rear axle is also deactivated, whereas in situation 2, the recuperation RHA on the rear axle is maintained despite the active ABS control ABSVA on the front axle (see hatching RHA*), thus achieving increased deceleration (see hatching V*).

FIG. 7 shows exemplary input and output parameters of the proposed brake control system 10.

For example, the brake control system 10 is provided with a first signal 11 that is representative of thrust recuperation. In addition, the brake control system 10 can be provided with a second signal 12 that is representative of a brake pressure>0.

The brake control system 10 controls, for example, the mechanical or hydraulic brakes associated with the front axle 13 and rear axle 14 as well as the recuperation brakes. For example, if the front axle 13 switches to ABS control 15, a comparison 16 of the predetermined brake pressure is made with a predetermined threshold value up to which the rear axle is kept in a brake recuperation state 17 in order to achieve a deceleration V of the vehicle.

Figure 8:
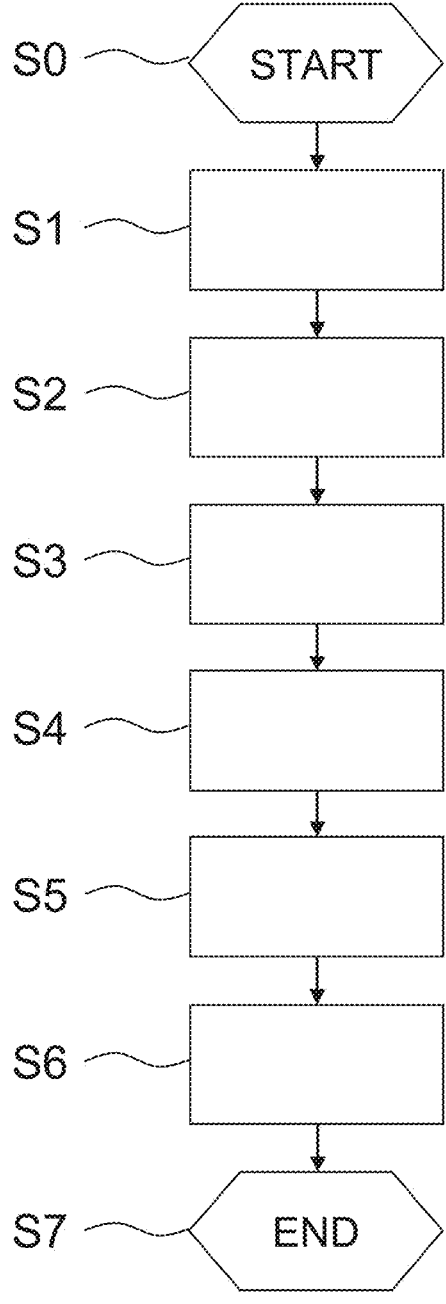
FIG. 8 illustrates an example flow diagram of a method for operating a brake control system for a vehicle.

A data and program memory is assigned to the brake control system 10, for example, on which a program for executing the proposed method is stored, which is explained in more detail below with reference to the flow diagram in FIG. 8. The program is started in a step SO, for example variables are initialised here. In a step S1, a thrust signal is provided that is representative of a coasting mode of the vehicle. The recuperation brakes associated with the front and rear axles are then activated (step S2). Steps S1 and S2 exemplify the situation when a driver releases the accelerator pedal and the vehicle recuperates.

In a step S3, a brake signal is provided that is representative of a vehicle brake actuation. The recuperation brakes remain activated. In a step S4, the mechanical or hydraulic brake associated with the front axle is activated depending on the brake signal. The recuperation brakes remain activated. Steps S3 and S4 are examples of the situation when the driver decides to actuate the operating brake and recuperation is maintained (blending).

In a step S5, a lock signal is provided that is representative of active ABS control of the front axle. In a step S6, the recuperation brake of the front axle is deactivated depending on the lock signal while the recuperation brake of the rear axle is still active. As an example, the process is then ended (step S7) or restarted. Alternatively, it is also conceivable to wait for any further lock signal representative of active ABS control of the rear axle, then also deactivate the recuperation brake of the rear axle and only then terminate the procedure. Steps S5 ff. exemplify the situation when the front axle is guided into ABS control due to the friction value conditions and the driver's pre-pressure is not sufficient to guide the rear axle into ABS control. With the potential M* possible for one axle (see FIG. 3), the recuperation remains at the axle not braked by ABS, while the ABS controls the front axle and no recuperation takes place.

The invention is not limited to the description based on the embodiments. Rather, the invention includes any new feature as well as any combination of features, which includes in particular any combination of features in the patent claims, even if this feature or combination itself is not explicitly stated in the patent claims or embodiments.

The invention claimed is:

1. A method for operating a brake control system for a vehicle having a first axle and a second axle that follows the first axle in a direction of travel of the vehicle, wherein the first and second axles are each associated with a recuperation brake for decelerating the vehicle while feeding energy back into an energy storage of the vehicle, and the first axle is associated with another brake with anti-lock braking control, and wherein the method comprises:
   providing the brake control system with a thrust signal, which is representative of a coasting mode of the vehicle;
   depending on the thrust signal, activating the recuperation brakes associated with the first and second axles;
   providing the brake control system with a brake signal, which is representative of a vehicle brake actuation;
   depending on the brake signal, trigger the another brake associated with the first axle;
   providing the brake control system with a lock signal, which is representative of an active anti-lock braking control of the another brake associated with the first axle; and
   depending on the lock signal, while maintaining the activation of the recuperation brake associated with the second axle, deactivating the recuperation brake associated with the first axle, and
   wherein in activating the recuperation brakes, the recuperation brakes associated with the first and second axles are each set to a thrust recuperation state.

2. The method according to claim 1, wherein in triggering the another brake, the recuperation brakes associated with the first and second axles are each set to a brake recuperation state.

3. The method according to claim 1, wherein the second axle is associated with a further brake with anti-lock braking control, and wherein in triggering the another brake, depending on the brake signal, the further brake associated with the second axle is triggered.

4. The method according to claim 3, wherein the method further comprises:
   providing the brake control system with a further lock signal, which is representative of an active anti-lock braking control of the further brake associated with the second axle; and
   depending on the further lock signal, deactivating the recuperation brake associated with the second axle.

5. A brake control system for a vehicle having a first axle and a second axle that follows the first axle in a direction of travel of the vehicle, wherein the brake control system is configured to:
   provide the brake control system with a thrust signal, which is representative of a coasting mode of the vehicle;
   depending on the thrust signal, activate recuperation brakes associated with the first and second axles;
   provide the brake control system with a brake signal, which is representative of a vehicle brake actuation;
   depending on the brake signal, trigger another brake associated with the first axle;
   provide the brake control system with a lock signal, which is representative of an active anti-lock braking control of the another brake associated with the first axle; and
   depending on the lock signal, while maintaining the activation of the recuperation brake associated with the second axle, deactivate the recuperation brake associated with the first axle, and
   wherein in activating the recuperation brakes, the recuperation brakes associated with the first and second axles are each set to a thrust recuperation state.

6. A non-transitory computer-readable storage medium, having stored thereon instructions for operating a brake control system for a vehicle, wherein the brake control system comprises a first axle and a second axle that follows the first axle in a direction of travel of the vehicle, wherein when the instructions are executed by a computer, the instructions cause the computer to perform a method comprising:
   providing the brake control system with a thrust signal, which is representative of a coasting mode of the vehicle;
   depending on the thrust signal, activating recuperation brakes associated with the first and second axles;
   providing the brake control system with a brake signal, which is representative of a vehicle brake actuation;
   depending on the brake signal, triggering another brake associated with the first axle;
   providing the brake control system with a lock signal, which is representative of an active anti-lock braking control of the another brake associated with the first axle; and
   depending on the lock signal, while maintaining the activation of the recuperation brake associated with the second axle, deactivating the recuperation brake associated with the first axle, and
   wherein in activating the recuperation brakes, the recuperation brakes associated with the first and second axles are each set to a thrust recuperation state.

* * * * *